United States Patent
Zernickel et al.

(10) Patent No.: US 6,240,826 B1
(45) Date of Patent: Jun. 5, 2001

(54) RADIAL PISTON PUMP

(75) Inventors: Alexander Zernickel, Herzogenaurach; Jörg Wagner, Oberreichenbach; Horst Döppling, Herzogenaurach, all of (DE)

(73) Assignee: INA Walzlager Schaffler oHG (DE)

( * ) Notice: Subject to any disclaimer, the term of this patent is extended or adjusted under 35 U.S.C. 154(b) by 0 days.

(21) Appl. No.: 09/433,976

(22) Filed: Nov. 4, 1999

(30) Foreign Application Priority Data

Nov. 5, 1998 (DE) ............................................. 198 50 920

(51) Int. Cl.$^7$ ............................... F16C 19/50; F01B 1/00
(52) U.S. Cl. ............................... 92/72; 384/447; 384/564
(58) Field of Search ............................... 92/72; 384/447, 384/564, 569

(56) References Cited

U.S. PATENT DOCUMENTS

| 5,230,275 | 7/1993 | Hodge et al. | 384/559 X |
| 5,348,382 | 9/1994 | Ebaugh et al. | 303/116.4 |

FOREIGN PATENT DOCUMENTS 0539849    5/1993   (EP) .

*Primary Examiner*—John E. Ryznic
(74) *Attorney, Agent, or Firm*—Bierman, Muserlian and Lucas

(57) ABSTRACT

The invention concerns a radial piston pump comprising a rotating pump shaft having an end portion connected to a rotationally fixed eccentric ring, said radial piston pump further comprising an eccentric bearing arranged on an outer peripheral surface of the eccentric ring, the eccentric bearing comprising a needle roller bushing having radially inward directed flanges between which bearing needle rollers are arranged for rolling, at least one pump plunger arranged in a pump housing and extending radially of the pump shaft being supported by an end face on the needle roller bushing, while the end portion of the pump shaft is supported in a housing via an adjacent second support bearing. According to the invention the eccentric ring and an inner ring of the support bearing (5) are configured as a one-piece bushing (22) shaped without chip removal, said one-piece bushing (22) being force-locked on the pump shaft (3) by a centric region (23), and both the centric region (23) and an eccentric region (24) of said one-piece bushing (22) comprise a radially outward directed flange (25, 26) on an outer end so that an inseparable assembly consisting of the eccentric bearing (6) and the support bearing (5) is formed.

6 Claims, 2 Drawing Sheets

RADIAL PISTON PUMP

FIELD OF THE INVENTION

The invention concerns a radial piston pump comprising a rotating pump shaft having an end portion connected to a rotationally fixed eccentric ring, said radial piston pump further comprising an eccentric bearing arranged on an outer peripheral surface of the eccentric ring, the eccentric bearing comprising a needle roller bushing having radially inward directed flanges between which bearing needle rollers are arranged for rolling, at least one pump plunger arranged in a pump housing and extending radially of the pump shaft being supported by an end face on the needle roller bushing, while the end portion of the pump shaft is supported in a housing via an adjacent second support bearing.

BACKGROUND OF THE INVENTION

A radial piston pump of the pre-cited type is known from EP O 539 849 B1. FIG. 3 of this prior art document shows a pump shaft whose end portion is retained in a housing via a support bearing which is configured as a ball bearing. An eccentric bearing comprises an eccentric ring which is pressed onto the end portion. The outer peripheral surface of the eccentric ring forms the inner raceway for cage-guided bearing needle rollers. The outer raceway for these bearing needle rollers is formed by a sheet metal bushing having radially inward directed flanges. The axial retention of this eccentric bearing is assured by two radially outward directed flanges of the eccentric ring which overlap the radially inward directed flanges of the needle roller bushing.

A drawback of this prior art is that the bearing arrangement requires a considerable amount of mounting work because two bearings, namely a support bearing and an eccentric bearing have to be handled and mounted separately. A further drawback is that the heavy, solid eccentric ring can cause vibration problems in the bearing arrangement. In addition, this type of mounting arrangement requires a large design space. Finally, manufacturing is also more expensive due to the large number of separate components.

OBJECTS OF THE INVENTION

It is therefore an object of the invention to create an improved eccentric and support bearing arrangement for a radial piston pump.

This and other objects and advantages of the invention will become obvious from the following detailed description.

SUMMARY OF THE INVENTION

The invention achieves the above objects by the fact that the eccentric ring and an inner ring of the support bearing are configured as a one-piece bushing shaped without chip removal, said bushing being force-locked on the pump shaft by a centric region, and both the centric region and an eccentric region of the bushing comprise a radially outward directed flange on an outer end so that an inseparable assembly consisting of the eccentric bearing and the support bearing is formed.

The advantage of the solution of the invention is firstly that a customer-oriented, ready-to-mount assembly consisting of the support and eccentric bearing is created which substantially simplifies the mounting procedure. In place of the hitherto usual stocking and handling of two different bearings, only one bearing arrangement is now required. A second advantage is that the vibration problems of the eccentric bearing are decisively reduced because the chiplessly shaped bushing has a substantially smaller mass so that its mass moment of inertia is also decisively reduced.

According to a further feature of the invention, the support bearing is a chiplessly shaped needle roller bearing whose needle roller bushing comprises radially inward directed flanges between which bearing needle rollers are guided in a cage for rolling.

One advantage of this support bearing is that it is manufactured without chip removal which is substantially cheaper than the fabrication of a solid bearing, and the second advantage is its economy of weight.

According to another feature of the invention, the flange of the needle roller bushing of the eccentric bearing adjacent to the housing has a radial dimension so as to slightly overlap the needle roller bushing of the support bearing. This prevents the eccentric bearing from slipping axially over the support bearing during transportation of the assembly. In addition, this also guarantees an axial support (abutment) of the eccentric bearing on the flange of the support bearing during operation.

According to still another feature of the invention, the flange of the eccentric region of the bushing has a variable radial dimension. This enables a simple compensation of errors of balance caused by the eccentricity so that a particularly low-vibration operation of the eccentric bearing is enabled. Moreover, this flange also serves to stiffen the eccentric region.

Finally, the radial piston pump of the invention is intended for use in anti-locking systems of vehicle brakes or in high-pressure cleaning appliances.

To obtain a high fluid pressure, the piston pumps of such high-pressure cleaning appliances are driven by an electric motor and, if necessary, by a high-speed transmission. On the one hand, the use of a radial piston pump of the invention reduces the rotating mass and, on the other hand, as a further advantage, the weight of the high-pressure cleaning appliance as a whole is also reduced.

The invention will now be described more closely with help of the following example of embodiment.

BRIEF DESCRIPTION OF THE DRAWINGS

FIG. 1 shows a partial longitudinal cross-section through a radial piston pump comprising a support bearing and an eccentric bearing, while

DETAILED DESCRIPTION OF THE DRAWINGS

Figure 1:
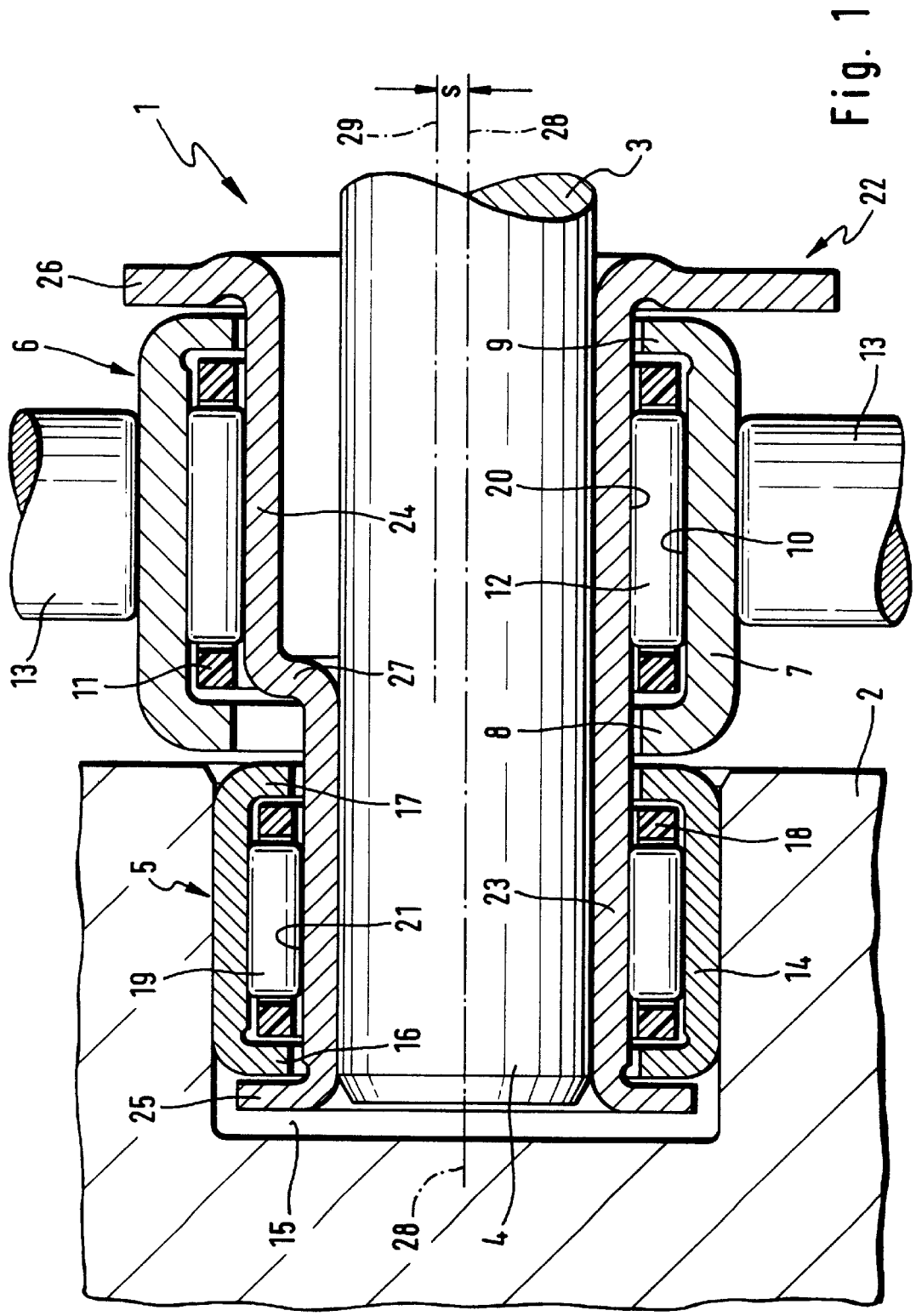

FIG. 1 shows a radial piston pump identified at 1 in whose housing 2, a pump shaft 3 is supported with its end portion 4 on a support bearing 5. An eccentric bearing 6 is arranged adjacent to the support bearing 5 and comprises an outer ring made as a chiplessly shaped needle roller bushing 7 having radially inward directed flanges 8 and 9. Bearing needle rollers 12 guided in a cage 11 are arranged between the flanges 8 and 9 for rolling contact with an outer raceway 10. End faces of pump plungers 13 which are arranged in a star pattern in a pump housing, not shown, bear against the outer peripheral surface of the needle roller bushing 7.

The support bearing 5 which is likewise made without chip removal as a needle roller bearing possesses a needle roller bushing 14 which is inserted into a housing bore 15. The needle roller bushing 14 also comprises two radially inward directed flanges 16 and 17 between which bearing needle rollers 19 are guided in a cage 18 for rolling.

The inner raceway 21 of the support bearing 5 and the inner raceway 20 of the eccentric bearing 6 are formed respectively by a centric region 23 and an eccentric region 24 of a one-piece, chiplessly shaped bushing 22 which is force-locked on the end portion 4 of the pump shaft 3 by the centric region 23. Both the centric region 23 and the eccentric region 24 comprise on their outer ends, radially outward directed flanges 25, 26 which overlap the flanges 16, 9 of the two bearings 5 and 6 so that an inseparable assembly is formed. This, however, further requires that the flange 8 of the needle roller bushing 7 likewise overlap radially the needle roller bushing 14 of the support bearing 5. The transition between the centric region 23 and the eccentric region 24 is achieved by an intermediate radial portion 27 in the central part of the bushing 22.

The central axis 29 of the eccentric region 24 of the bushing 22 being eccentrically offset by the amount s, the radially disposed pump plungers 13 experience a radial reciprocating motion when the pump shaft 3 is caused to rotate about its axis of rotation 28.

Figure 2:
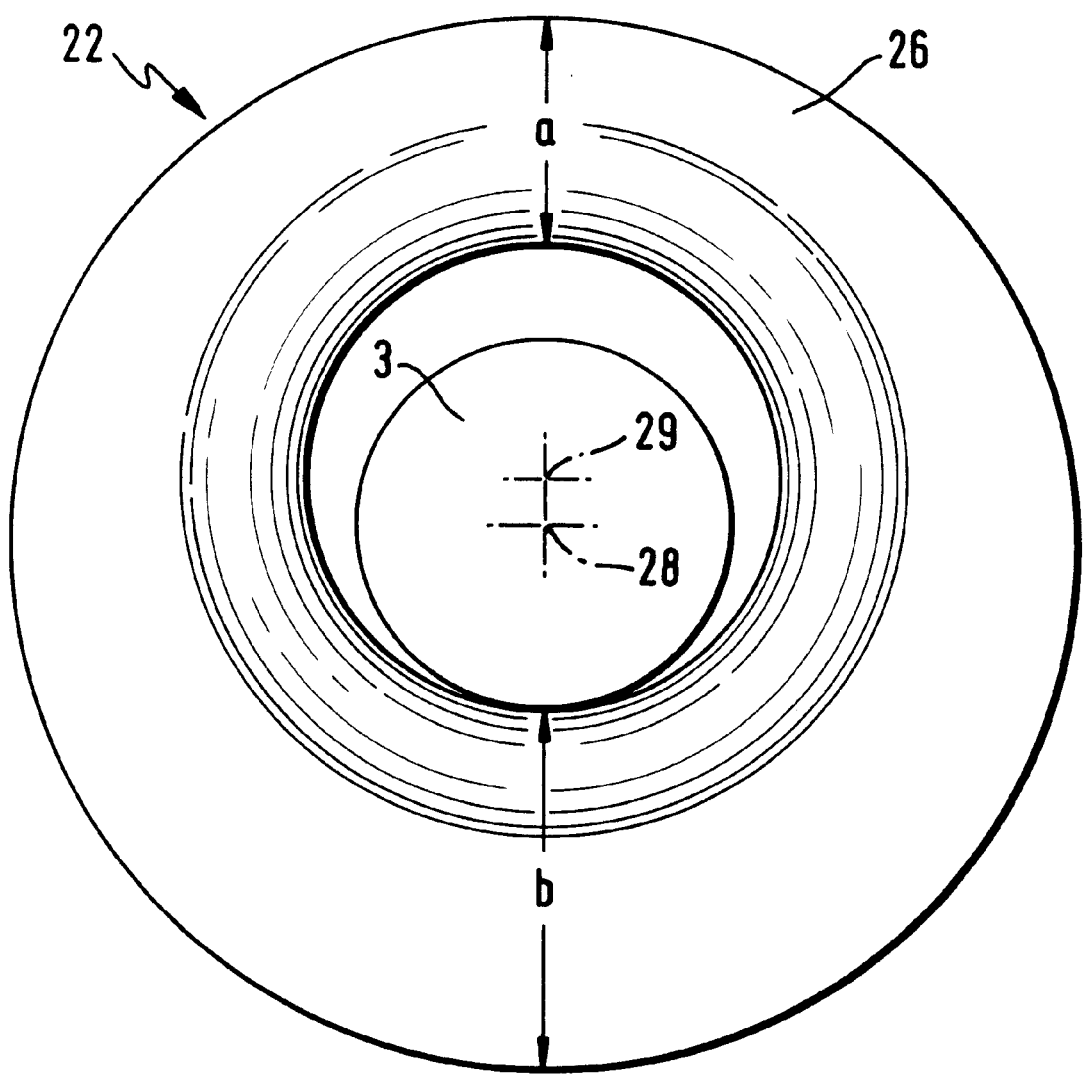
FIG. 2 is a schematic side view of the eccentric bearing of FIG. 1.

To compensate for the errors of balance caused by the eccentricity of the region 24, the right-hand flange 26 of the bushing 22 has a variable radial dimension. As can be seen in FIG. 2, the radial dimension a of the flange 26 in the upper region is smaller than the radial dimension b in the lower region. In addition, the flange 26 contributes to an increase of stiffness of the eccentric region 24 of the bushing 22.

What is claimed is:

1. A radial piston pump comprising a rotating pump shaft having an end portion connected to a rotationally fixed eccentric ring, said radial piston pump further comprising an eccentric bearing arranged on an outer peripheral surface of the eccentric ring, the eccentric bearing comprising a needle roller bushing having radially inward directed flanges between which bearing needle rollers are arranged for rolling, at least one pump plunger arranged in a pump housing and extending radially of the pump shaft being supported by an end face on the needle roller bushing, while the end portion of the pump shaft is supported in a housing via an adjacent second support bearing, wherein the eccentric ring and an inner ring of the support bearing are configured as a one-piece bushing shaped without chip removal, said one-piece bushing being force-locked on the pump shaft by a centric region, and both the centric region and an eccentric region of said one-piece bushing comprise a radially outward directed flange on an outer end so that an inseparable assembly consisting of the eccentric bearing and the support bearing is formed.

2. A radial piston pump of claim 1 wherein the support bearing is a chiplessly shaped needle roller bearing having a needle roller bushing which comprises radially inward directed flanges between which bearing needles are guided in a cage for rolling.

3. A radial piston pump of claim 1 wherein one of the flanges of the needle roller bushing of the eccentric bearing which is adjacent to the housing has a radial dimension so as to slightly overlap the needle roller bushing of the support bearing.

4. A radial piston pump of claim 1 wherein the flange of the eccentric region of the one-piece bushing has a variable radial dimension.

5. A radial piston pump of claim 1 which serves to supply pressure medium in an anti-locking system of vehicle brakes.

6. A radial piston pump of claim 1 which is arranged in a high-pressure cleaning appliance.

* * * * *